(12) United States Patent
Koshiba

(10) Patent No.: US 8,714,796 B2
(45) Date of Patent: May 6, 2014

(54) OUTER CASING FOR HEADLIGHT AND HEADLIGHT

(75) Inventor: Akiyasu Koshiba, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 230 days.

(21) Appl. No.: 13/433,104

(22) Filed: Mar. 28, 2012

(65) Prior Publication Data

US 2012/0250344 A1  Oct. 4, 2012

(30) Foreign Application Priority Data

Mar. 28, 2011 (JP) .................. 2011-070849

(51) Int. Cl.
*B60Q 1/04* (2006.01)
*B60Q 1/34* (2006.01)
*F21V 15/01* (2006.01)

(52) U.S. Cl.
CPC .. *B60Q 1/04* (2013.01); *B60Q 1/34* (2013.01); *F21V 15/01* (2013.01)
USPC ........................................................ 362/546

(58) Field of Classification Search
CPC .... B60Q 1/2619; F21S 48/1208; F21V 15/01
See application file for complete search history.

(56) References Cited

U.S. PATENT DOCUMENTS

| 4,739,223 | A | * | 4/1988 | Baba et al. | 315/82 |
| 5,107,405 | A | * | 4/1992 | Makita | 362/467 |
| 5,285,357 | A | * | 2/1994 | Makita | 362/549 |
| 5,521,798 | A | * | 5/1996 | Bertling et al. | 362/514 |
| 6,161,953 | A | * | 12/2000 | Chouji et al. | 362/546 |
| 6,883,938 | B1 | * | 4/2005 | Kohara et al. | 362/296.04 |
| 7,153,010 | B2 | * | 12/2006 | Yamada et al. | 362/509 |
| 8,470,233 | B2 | * | 6/2013 | Koshiba | 264/328.1 |

FOREIGN PATENT DOCUMENTS

JP  3112717 B2  11/2000

* cited by examiner

*Primary Examiner* — Bao Q Truong
(74) *Attorney, Agent, or Firm* — Kenealy Vaidya LLP

(57) ABSTRACT

An outer casing for headlights and a headlight using the outer casing can include an outer lens having an opening portion and a casing having an opening portion. The opening portion of the outer lens can include a sealing projection and a water guard rib, and the opening portion of the casing can include an end surface and a sealing concave portion. The outer lens can be attached to the casing so that the sealing projection is inserted in the sealing concave portion while the water guard rib contacts the end surface. The outer lens can be casted by a simple molding tool such that a burr is prevented from occurring on the opening portion. Therefore, the headlight using the outer casing can incorporate various lamps with an airtight structure and an adequate mechanical strength even when the outer lens is formed in a thickness of less than 2.5 millimeters.

20 Claims, 9 Drawing Sheets

OUTER CASING FOR HEADLIGHT AND HEADLIGHT

This application claims the priority benefit under 35 U.S.C. §119 of Japanese Patent Application No. 2011-070849 filed on Mar. 28, 2011, which is hereby incorporated in its entirety by reference.

BACKGROUND

1. Field

The presently disclosed subject matter relates to outer casings for headlights, and to headlights using the outer casings. More particularly, the disclosed subject matter relates to outer casings including a thin outer lens, which can be casted by a simple molding tool that can prevent an occurrence of burr(s) on the outer lens, and to headlights using the outer casings, which can incorporate various lamps such as a low beam headlight with a high airtight structure and an adequate mechanical strength even when the outer lens is formed in a thickness of less than 2.5 millimeters.

2. Description of the Related Art

Conventional general headlights frequently incorporate various lamps such as a low beam headlight, a high beam headlight, a turn signal lamp and the like into an outer casing, which is devised so as to match with a design of a vehicle as a front combination lamp. The outer casing is generally composed of a casing to fix the various lamps and an outer lens attached to the casing so that light emitted from the various lamps can be emitted in a light-emitting direction for each of the lamps.

The outer casing may also perform a sealing function to protect the various lamps from a fluid such as rain, a dust such as dirt on a road, etc. In addition, in accordance with a trend of automotive lighting and for purpose of an improvement of fuel efficiency, the outer casing has been constantly required to be reduced in weight, along with the various lamps incorporated therein, while maintaining an adequate mechanical strength.

Accordingly, the outer lens, which can be formed in a thin thickness, has been constantly required to cause a reduction in weight for headlights in addition to efficiently transmitting the lights emitted from the various lamps. Moreover, even when the outer lens can be formed in a thin thickness, the outer lens can be attached to the casing with confidence while the outer casing is maintained at a high air proof efficiency and an adequate mechanical strength.

FIG. 6 is a top view showing a conventional general outer lens for a headlight. The outer lens 80 is composed of a facing portion 88 and a sealing rib 86, and can be made by a molding injection method using a thermoplastic polycarbonate resin as a raw material. FIG. 7 is a side cross-sectional view showing the conventional outer lens 80 taken along line A-A shown in FIG. 6, in a case where the outer lens 80 is casted by a molding tool.

The molding tool includes: a cavity die 81; a core die 82 being mold-clamped to the cavity die 81; a first cavity 89 casting the facing portion 88; a second cavity 87 casting the sealing rib 86; an inlet 83 injecting a plasticized raw material; a cold runner 84 passing through the plasticized raw material; and a gate 85 filling the plasticized raw material in the second cavity 87 and the first cavity 89 in turn, as shown in FIG. 7. Thereby, the molding tool may cast the outer lens 80 as shown in FIG. 6.

In this case, a maximum injection pressure of 180 MPa is used to inject the plasticized raw material in the first and the second cavities 89 and 87 spaced between the cavity die 81 and the core die 82. Accordingly, a huge force may be applied to a parting line 90 located between the cavity die 81 and the core die 82 in a detaching direction of the cavity die 81 and the core die 82.

As a result, the plasticized raw material may invade into a thin space of the parting line 90, and therefore may cause a burr on the outer lens 80 casted by the first cavity 89 and the second cavity 87 during the molding process. In addition, when the core die 82 is detached from the cavity die 81, because the burr drops from the parting line 90 and then occasionally adheres to a product of the outer lens 80, it sometimes happens that the burr disfigures the product of the outer lens 80.

When the burr occurs on the product, the product including the burr needs to be provided with an additional process for removing the burr after the molding process. In this case, the additional process may cause declining productivity and an increase in production costs. Therefore, a molding tool in which a burr does not occur in the molding process is desired to cast a product even when a thickness of the product is thin.

FIG. 8 is a graph showing a relationship between a thickness of a general molding product and an injection pressure. As the thickness of the molding product becomes thin, a higher injection pressure is required to cast the molding product. When a polycarbonate plate of 500 $mm^2$ is casted in thicknesses of 4 mm, 3 mm, 2 mm and 1 mm, an injection pressure of 50 MPa (in case of the thickness of 4 mm) to 180 MPa (in case of the thickness of 1 mm) may be required to cast the polycarbonate plate, because a viscosity of the polycarbonate resin is relatively high.

Accordingly, when the outer lens 80 having a thinner facing portion 88 is casted by a molding tool, because a much larger force may be applied to the parting line 90 located between the cavity die 81 and the core die 82 in a detaching direction of the cavity die 81 and the core die 82, the larger force may be associated with a high probability of an occurrence of the burr.

In the conventional general outer lens 80, when the outer lens 80 including the facing portion 88 having a thickness of 2.5 mm to 3.5 mm is casted by a molding tool, the burr may barely occur on the outer lens 80. However, when the outer lens 80 including the facing portion 88 having a thickness of less than 2.5 mm is casted by the molding tool, the burr may occasionally occur on the outer lens 80.

A conventional molding tool, in which a burr may hardly occur even when a thin molding product is casted, is disclosed in Patent Document No. 1 (Japanese Patent No. 3,112,717). FIG. 9 is a schematic side cross-sectional view of a basic structural concept of the conventional molding tool to cast a casing having a thin thickness, which is disclosed in Patent Document No. 1.

The conventional molding tool 70 includes: a cavity die 72 including a centering location structure 76; a core die 71 being mold-clamped to the cavity die 72; a slide die 74 being mold-clamped to the cavity die 72 and the core die 71; a cavity 77 casting a thin casing; an inlet 75 for injecting a plasticized raw material; and a gate 75a for filling the plasticized raw material in the cavity 77. Thus, the molding tool 70 may cast the thin casing corresponding to a shape of the cavity 77.

In this case, a parting line 73 may be located between the slide die 73 and both the cavity die 72 and the core die 71, and the slide die 74 may move in a direction of arrow 74a. An injection pressure may be applied in a direction of arrow 77a when the molding tool 70 injects the plasticized raw material into the cavity 77. Accordingly, a huge force for the injection pressure may be applied in the direction of arrow 77a, which is parallel to the direction of the parting line 73. Therefore, even when the casing having a thin thickness is casted by the molding tool 70, the conventional molding tool 70 may prevent an occurrence of the burr on the casing such that is caused by the parting line 73.

The above-referenced Patent Documents is listed below, and is hereby incorporated with its English abstract in its entirety.

1. Patent Document No. 1: Japanese Patent No. 3,112,717

However, the structure of the conventional molding tool 70 includes the slide die 74 having the parting line 73 moving in the direction of arrow 74a, in addition to the cavity die 72 including the centering location structure 76 and the core die 71, which move in a parallel direction with the parting line 73. Accordingly, because the conventional structure is complex, design and a manufacture of a molding tool based upon the conventional structure may require great care and time. Moreover, the structure may cause a reduction of productivity as compared with the conventional manufacturing method for the outer lens due to the complex structure.

The disclosed subject matter has been devised to consider the above and other problems, features, and characteristics. Thus, embodiments of the disclosed subject matter can include outer casings for headlights, in which an outer lens having a facing portion can be casted without (or with reduced numbers of) an occurrence of burr(s) by a simple molding tool in common with a conventional molding tool for an outer lens even when the facing portion is casted in a thin thickness. The disclosed subject matter can also include headlights using the outer casings, which can incorporate various lamps such as a low beam headlight, a position lamp and the like with a high airtight structure and an adequate mechanical strength even when the facing portion of the outer lens is formed in a thin thickness of less than 2.5 millimeters.

SUMMARY

The presently disclosed subject matter has been devised in view of the above and other problems, features, and characteristics in the conventional art, and to make certain changes and improvements to existing outer lenses for headlights. An aspect of the disclosed subject matter includes outer casings having a thin facing portion for headlights, which can reduce a weight and a thickness while keeping a lamp space in which it is easy to incorporate various vehicle lamps such as a high beam headlight and the like, and which can be casted substantially without an occurrence of burr(s) by a simple molding tool in common with a conventional molding tool for an outer lens.

According to an aspect of the disclosed subject matter, an outer casing for headlights can include an outer lens having a facing portion, a peripheral portion, a sealing portion and a water guard rib casted by a transparent thermoplastic resin and formed in a dome shape having an opening, the peripheral portion formed in a ring shape so as to surround the facing portion having a lens thickness of the outer lens and being continuously connected to the facing portion, and therefore the peripheral portion having a substantially same lens thickness as the lens thickness of the facing portion, and connecting to a sealing projection on the opposite side of the facing portion, the sealing projection having a thickness, at least three surfaces of an inner surface, an outer surface and a connecting surface and also having an end located between the inner surface and the outer surface on the opposite side of the connecting surface, the connecting surface of the sealing projection being connected to an outer surface opposite an inner surface of the peripheral portion, the thickness of the sealing projection defined as a minimum thickness between the inner surface and the outer surface of the sealing projection and thinning from the connecting surface toward the end of the sealing projection, the water guard rib having a thickness, an outer surface, an end surface and a guard surface being connected to the sealing projection using a resin casted between the connecting surface and the outer surface of the sealing projection, the outer surface of the water guard rib connecting to the outer surface of the sealing projection, the end surface of the water guard rib located between the outer surface and the guard surface of the water guard rib, the guard surface of the water guard rib connecting to the connecting surface of the sealing projection, the thickness of the water guard rib defined as a minimum thickness between the guard surface and the outer surface of the water guard rib and thickening toward the end surface of the water guard rib, and wherein the lens thickness is less than a minimum inscribed circle of the at least three surfaces of the sealing projection and is more than the minimum thickness of the water guard rib.

Additionally, the outer casing can also include: a casing having a first end surface, a second end surface, an opening and a sealing concave portion and made of an opaque resin, the opening of the casing including an inner surface of the casing, the first end surface formed in a ring shape so as to surround the opening, the second end surface also formed in a ring shape so as to surround the first end surface, and thereby the sealing concave portion configured to be formed between the first end surface and the second end surface and along the inner surface of the opening, and wherein at least the end of the sealing projection of the outer lens is annularly inserted into the sealing concave portion, and also the second end surface of the casing annularly contacts with the outer surface of the water guard rib of the outer lens; and at least one interlocking member of a sealing material, an adhesive material and a hot-melt adhesive being disposed between the sealing concave portion of the casing and at least one of the end, the inner surface and the outer surface of the sealing projection of the outer lens.

In the above-described exemplary outer casing for headlights, the lens thickness of the outer lens can be configured to become less than 2.5 millimeters, and also the transparent thermoplastic resin of the outer lens can include a polycarbonate resin. In addition, a continual part of the inner surface of the peripheral portion located at an upper portion of the outer lens can be substantially parallel to a continual part of the inner surface of the opening located at an upper portion of the casing so that an imaginary surface extending from the continual part of the inner surface of the opening toward the outer lens does not intersect with the continual part of the inner surface of the peripheral portion located at the upper portion of the outer lens, in order to keep a useful space for incorporating various vehicle lamps and in order to improve a fixing activity and a mechanical strength.

Moreover, the outer surface of the water guard rib of the outer lens can be configured to be annularly located on a substantially same planar surface, and also the inner surface of the sealing projection can be continuously connected to the inner surface of the peripheral portion of the outer lens using a continuous surface, so that the outer lens can be casted by a simple molding tool. Furthermore, so that an occurrence of burr(s) on the outer lens can be prevented using a simple molding tool, the guard surface of the water guard rib can continuously connect to the connecting surface of the sealing projection using a continuous surface, the outer surface of the water guard rib can be annularly formed in a continuous surface, and also the guard surface of the water guard rib can annularly project between the end surface of the water guard rib and a halfway portion of the guard surface in an opposite direction of the outer surface of the water guard rib so that the thickness of the water guard rib thickens toward the end surface of the water guard rib. When a light source having an optical axis for a headlight is located in the outer casing, the optical axis of the light source can intersect with an imaginary surface including the outer surface of the water guard rid at a sharp angle toward the casing, in order to improve a function and an outside appearance of the headlight.

According to the above-described exemplary outer casing, when the outer lens is casted by a molding tool, for example, a plasticized resin having an injection pressure of 180 MPa, which is injected into a cavity casting the facing and peripheral portion of the outer lens, can reduce that having an injection pressure of 37 MPa in another cavity casting the water guard rib of the outer lens. Accordingly, the above-described structure can perfectly prevent an occurrence of a burr on the water guard rib that annularly contacts with the second end surface of the casing, even when the lens thickness of the outer lens is formed in a thickness of less than 2.5 millimeters. In addition, the structure can provide the ouster casing including the outer lens with a high airtight structure and an adequate mechanical strength. Thus, the disclosed subject matter can provide outer casings including a thin outer lens with a high airtight structure and an adequate mechanical strength, in which the thin outer lens can casted by a simple molding tool that can prevent the outer lens from an occurrence of a burr.

Another aspect of the disclosed subject matter includes headlights using the outer casings. An exemplary headlight can include at least one vehicle lamp of a low beam headlight and a high beam headlight incorporated into the outer casing so that each of the lights emitted from the low beam headlight and the high beam headlight is emitted in each respective light-emitting direction of the low beam headlight and the high beam headlight via the outer lens of the outer casing. In addition, the exemplary headlight can further include at least one vehicle lamp of a turn signal lamp and a position lamp incorporated into the outer casing so that each of lights emitted from the turn signal lamp and the position lamp is emitted in each light-emitting direction of the turn signal lamp and the position lamp via the outer lens of the outer casing.

In the above-described exemplary headlight, the same or similar variations of the outer casing can also be employed as set forth with respect to other embodiments described above.

According to the exemplary headlight described above, various lamps such as the low beam headlight and the like can be incorporated into the outer casings having the useful space, in which a thin outer lens can be attached to the casing with confidence by fixing between the sealing concave portion of the casing and the sealing projection of the outer lens such that cannot perfectly include a burr via the at least one interlocking member. Thus, the disclosed subject matter can provide headlights using the outer casings, which can incorporate various lamps such as a low beam headlight with a high airtight structure and an adequate mechanical strength even when the facing portion of the outer lens is formed in thickness of less than 2.5 mil meters.

BRIEF DESCRIPTION OF THE DRAWINGS

These and other characteristics and features of the disclosed subject matter will become clear from the following description with reference to the accompanying drawings, wherein:

FIG. 1b is a cross-sectional view of the exemplary embodiment of the outer casing for headlights taken along line B-B shown in FIG. 1a;

DETAILED DESCRIPTION OF EXEMPLARY EMBODIMENTS

Figure 1A:
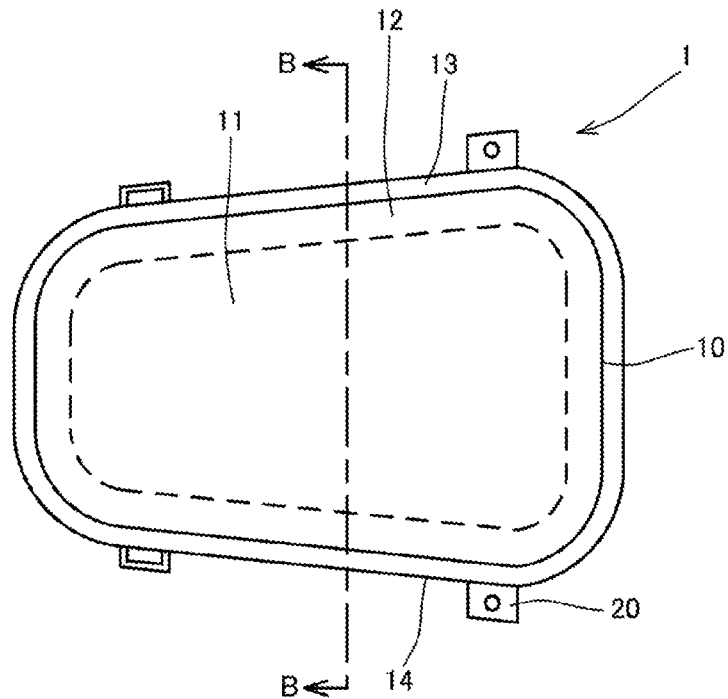
FIG. 1a is a top view showing an exemplary embodiment of an outer casing for headlights made in accordance with principles of the disclosed subject matter.
Figure 1B:
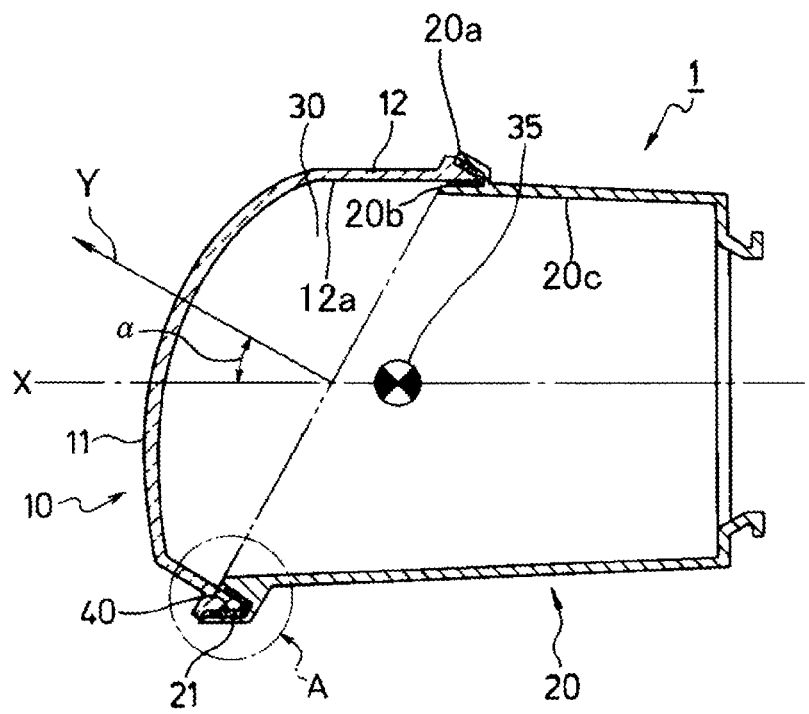

Exemplary embodiments and manufacturing methods of the disclosed subject matter will now be described in detail with reference to FIGS. 1a to 5. FIG. 1a is a top view showing an exemplary embodiment of an outer casing for headlights made in accordance with principles of the disclosed subject matter, and FIG. 1b is a cross-sectional view the embodiment of the outer casing for headlights taken along line B-B shown in FIG. 1a.

The outer casing 1 can include a casing 20 having an opening that is provided with a sealing concave portion 21 formed in a ring shape, an outer lens 10 attached to the sealing concave portion 21 of the casing 20 via at least one interlocking member 40 of a sealing material, an adhesive material and a hot-melt adhesive, and thereby forming a lamp room 30 formed as a space to arrange various vehicle lamps such as a low beam headlight, a high beam headlight, a turn signal lamp, a position lamp, etc. A light source 35 having an optical axis X can be used as a light source device for one of the various vehicle lamps as shown in FIG. 1.

The outer lens 10 can be composed of a transparent thermoplastic resin such as polycarbonate, and can be casted by a molding tool portions of which are in common with a conventional outer lens. In this case, a cavity die and a core die of the molding tool for casting the outer lens 10 can move in a direction of arrow Y, which intersects at an angle α with respect to the optical axis X of the light source 35. The outer lens 10 can be formed in a dome shape having an opening, and can also include a facing portion 11 to allow light to pass through after being emitted from the light source 35, and a peripheral portion 12 having an inner surface 12a, which connects between the facing portion 11 and an edge portion of the opening.

The edge portion of the opening of the outer lens 10 can include a sealing projection 13 and a water guard rib 14 as shown in FIG. 1a. The outer lens 10 can be attached to the sealing concave portion 21 of the casing 20 using the sealing projection 13 and the water guard rib 14 thereof via the at least one interlocking member 40, as described in detail later.

The casing 20 can be composed of an opaque resin, and can have a first end surface 20b, a second end surface 20a, an upper portion, an inner surface 20c, the opening and the sealing concave portion 21. The opening of the casing 20 can include the inner surface 20c of the casing 20. The first end surface 20b can be formed in a ring shape so as to surround the opening, and the second end surface 20a can also be formed in a ring shape so as to surround the first end surface 20b, and thereby the sealing concave portion 21 can be formed between the first end surface 20b and the second end surface 20a and along the inner surface 20c of the opening of the casing 20 as shown in FIG. 1b.

A continual part of the inner surface 12a of the peripheral portion 12 of the outer lens 10 can be formed at an upper portion of the outer lens 10, and can be substantially parallel to a continual part of the inner surface 20c of the opening located at the upper portion of the casing 20 so that an imaginary surface extending from the continual part of the inner surface 20c of the casing 20 located toward the outer lens 10 does not intersect with the continual part of the inner surface 12a of the peripheral portion 12 located at the upper portion of the outer lens 10.

In this case, each of the continual part of the inner surface 12a of the peripheral portion 12 and the continual part of the inner surface 20c of the casing 20 can also be formed in a substantially planar shape. Thereby, the outer casing 1 can keep a useful space for incorporating various vehicle lamps and also can improve a fixing activity connecting between the outer lens 10 and the casing 20 and a mechanical strength.

Figure 2:
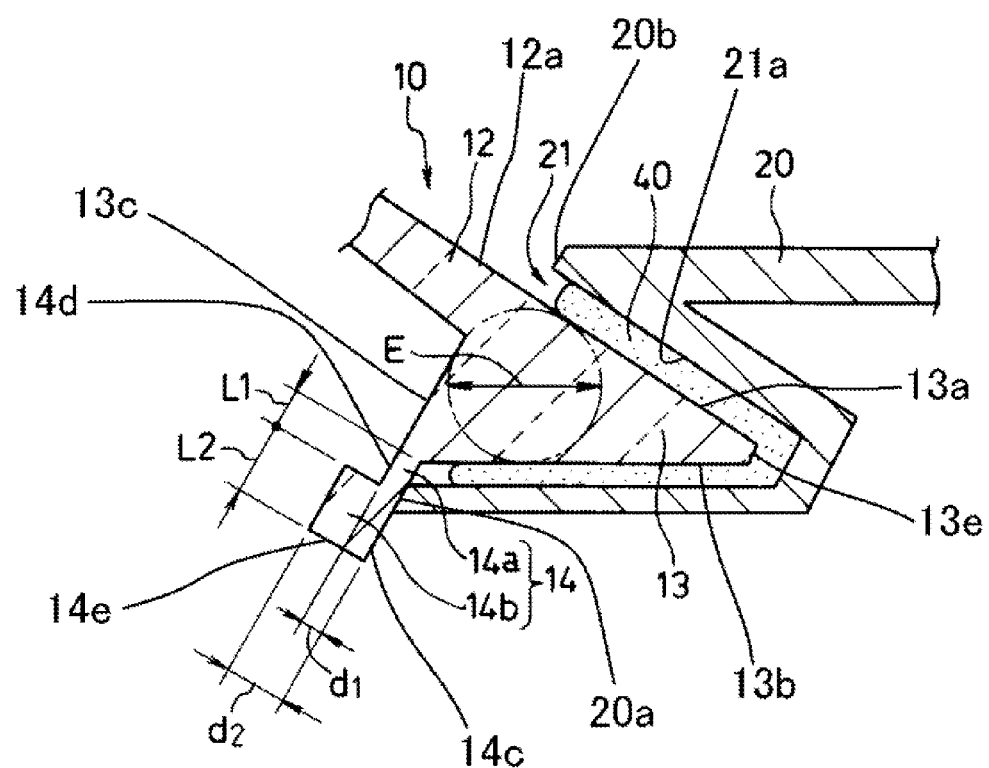
FIG. 2 is a close up cross-sectional view showing a connection region A between an outer lens and a casing in the embodiment of the outer casing shown in FIG. 1.

FIG. 2 is a close up cross-sectional view showing a connection region A between the outer lens 10 and the casing 20 in the embodiment of the outer casing shown in FIG. 1. The casing 20 can be composed of a thermoplastic opaque resin such as polybutylene terephthalate resin and the like, and can be formed in cup shape having the opening. The opening of the casing 20 can be provided with the sealing concave portion 21, which is formed in a ring shape so as to surround between the first end surface 20b and the second end surface 20a.

In contrast, the edge portion of the opening of the outer lens 10 can include the sealing projection 13 that can be inserted into the sealing concave portion 21 of the casing 20, so that the outer lens 10 can be attached to the casing 20 via the at least one interlocking member 40 of the sealing material, the adhesive material and the hot-melt adhesive. Accordingly, while the connection region A between the outer lens 10 and the casing 20 can maintain an air proof state using the at least one interlocking member 40, the outer lens 10 can be attached to the casing 20 with confidence so that fluid, dust and the like are prevented from entering into the lamp room 30 from the connection region A.

The sealing projection 13 can have an inner surface 13a connecting to the inner surface 12a of the peripheral portion 12 of the outer lens 10, an outer surface 13b, an end 13e located between the inner surface 13a and the outer surface 13b that extends so as to reduce or become thinner in a thickness dimension therebetween toward the end 13e, and a connecting surface 13c connecting to the peripheral portion 12 of the outer lens 10.

The sealing projection 13 can be formed in a substantially triangular cross-sectional shape, in view taken along an imaginary perpendicular surface with a parting surface of the molding tool for the outer lens 10 so that an area of the imaginary perpendicular surface becomes minimized on the sealing projection 13. In this case, when each lens thickness of the facing portion 11 and the peripheral portion 12 is less than 2.5 millimeters, a diameter E of an inscribed circle of the triangular cross-sectional shape can be approximately 5 millimeters, and the water guard rib 14 can be configured to extend from the sealing projection 13 and can be configured to contact with the first end surface 20b of the sealing concave portion 21 of the casing 20.

The water guard rib 14 can include a first water guard rib 14a having an outer surface 14c connecting to the outer surface 13b of the sealing projection 13 and a guard surface 14d connecting to the connecting surface 13c to the sealing projection 13, and a second water guard rib 14b having the outer surface 14c connecting to the outer surface 14c of the first water guard rib 14a, the guard surface 14d connecting to the guard surface 14d of the first water guard rib 14a and an end surface 14e, as shown in FIG. 2.

When the diameter E of the inscribed circle of the triangular cross-sectional shape is approximately 5 millimeters, the first guard rib 14a can be formed in a length L1 of 1 millimeter and a thickness d1 of 0.8 millimeters, and also the second guard rib 14b can be formed in a length L2 of 2 millimeters and a thickness d2 of 2.5 millimeters.

When the outer lens 10 is attached to the casing 20, the at least one interlocking member 40 of the sealing material, the adhesive material and the hot-melt adhesive can be disposed between an inner surface 21a of the sealing concave portion 21 of the casing 20 and at least one of the end 13e, the inner surface 13a and the outer surface 13b of the sealing projection 13 of the outer lens 10. In addition, the water guard rib 14 can prevent a fluid such as rain from entering into the outer casing 1 by contacting the outer surface 14c of the water guard rib 14 with the first end surface 20b of the casing 20.

Figure 3:
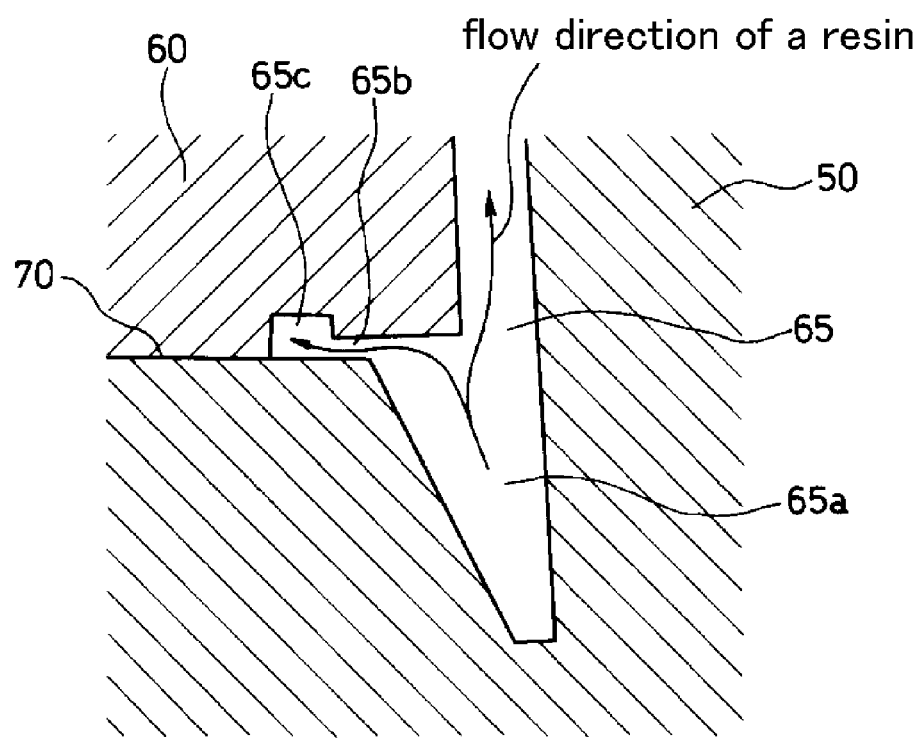
FIG. 3 is a close up cross-sectional view depicting an exemplary structure of a molding tool at an edge portion of an opening of the outer lens in the molding tool for casting the outer lens shown in FIG. 2.

FIG. 3 is a close up cross-sectional view depicting an exemplary structure of a molding tool at the edge portion of the opening of the outer lens 10 in the molding tool for casting the outer lens 10 shown in FIG. 2. The exemplary structure can include: a cavity die 50; a core die 60 being mold-clamped to the cavity die 50; a cavity 65 casting the edge portion of the opening of the outer lens 10; and a parting surface 70 located between the cavity die 50 and the core die 60.

The cavity 65 can include: a first cavity 65a casting the sealing projection 13; a second cavity 65b casting the first water guard rib 14a; and a third cavity 65c casting the second water guard rib 14b. In each of the second cavity 65b and the third cavity 65c casting the first water guard rib 14a and the second water guard rib 14b, a continual surface of the second cavity 65b and the third cavity 65c can cast the outer surface 14c of the first water guard rib 14a and the second water guard rib 14b, which contacts with the first end surface 20b of the sealing concave portion 21 of the casing 20. The continual surface of the second cavity 65b and the third cavity 65c can be the same planar surface, which is located on the parting surface 70 between the cavity die 50 and the core die 60.

Here, when the cavity die 50 and the core die 60 is set up at 80 degrees Celsius and when the plasticized raw material of the polycarbonate resin set up at 280 degrees Celsius is injected into the cavity die 50 and the core die 60 at an injection pressure of 180 MPa, the plasticized polycarbonate resin can fill in the cavity 65 in approximately 3.9 seconds.

In more detail, first of all, the plasticized polycarbonate resin may be injected into the first cavity 65a casting the sealing projection 13, and then may be injected into the third cavity 65c casting the second water guard rib 14b after filling in the second cavity 65b in which the first water guard rib 14a is cast, while filling in another cavity (not shown in FIG. 3) casting the facing portion 11 and the peripheral portion 12.

In this case, a cross-sectional area of the third cavity 65c, where the plasticized polycarbonate resin may fill lastly in the cavity 65, is larger than that of the second cavity 65b. Accordingly, because the plasticized polycarbonate resin filling in the second cavity 65b can dispersed into the third cavity 65c from the second cavity 65b while an injection pressure thereof reduces, an injection pressure of the plasticized polycarbonate resin in a detaching direction of the cavity die 50 and the core die 60 in the third cavity 65c can be reduced as compared with a conventional molding tool structure for the outer lens 10.

Specifically, the plasticized polycarbonate resin having the injection pressure of 180 MPa, which is injected into the cavity die 50 and the core die 60, can become that having an injection pressure of 37 MPa in the third cavity 65 casting the second water guard rib 14b. Therefore, on the outer surface 14c of the first and the second water guard ribs 14a and 14b of the outer lens 10, a burr may be prevented from occurring, even when the facing portion 11 and the peripheral portion 12 of the outer lens 10 is formed in a thickness of less than 2.5 millimeters.

As described above, the structure can provide the outer lens 10, which does not include a burr on the outer surface 14c of the water guard rib 14 located on the parting surface 70 of the molding tool for the outer lens 10, even when the facing portion 11 and the peripheral portion 12 of the outer lens 10 is formed in a thickness of less than 2.5 mil meters. Thus, the disclosed subject matter can provide the outer casings including a thin outer lens with a high airtight structure, which can be casted by a simple molding tool in common with a conventional molding tool for the outer lens 10, and which can reduce a weight and a thickness of the overall structure.

Figure 4:
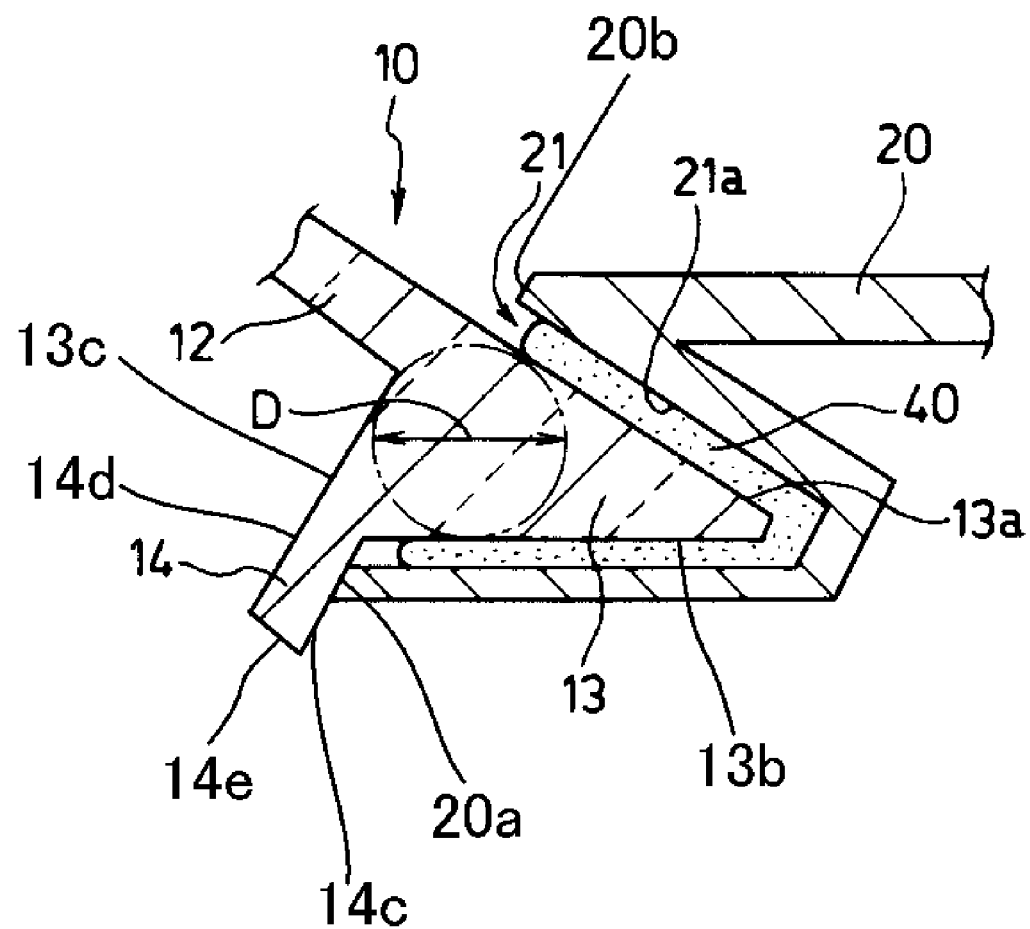
FIG. 4 is a close up cross-sectional view showing a connection region A between an outer lens and a casing in a comparative embodiment of the outer casing shown in FIG. 1.

In order to evaluate the outer casing 1 made in accordance with principles of the disclosed subject matter, comparative embodiments of the outer casing will now be described with reference to FIG. 4. FIG. 4 is a close up cross-sectional view showing the connection region A between an outer lens 10 and a casing 20 in the comparative embodiments, in which the same or corresponding elements of the embodiment of FIG. 2 use the same reference marks.

The casing 20 of the comparative embodiments is the completely same as the casing 20 of the above-described embodiment. Each of the outer lenses 10 of the comparative embodiments is also basically the same as the outer lens 10 of the embodiment, however, each thickness of the facing portions 11 and the peripheral portions 10 and a shape of the water guard ribs 14 in the comparative embodiments are different from that of the facing portions 11 and the peripheral portions 10 of the water guard rib 14, respectively.

According to the comparative embodiments, each thickness of the facing portion 11 and the peripheral portion 12 of a first comparative embodiment is from 2.5 to 3.5 millimeters, and each thickness of the facing portion 11 and the peripheral portion 12 of a second comparative embodiment is less than 2.5 millimeters. Each diameter D of inscribed circles of the triangular cross-sectional shapes of the comparative embodiments is approximately 5 millimeters in common with the diameter E of the embodiment. Each of the water guard ribs 14 of the comparative embodiments extends from the sealing projection 13 so as to be able to contact with the first end surface 20b of the sealing concave portion 21 of the casing 20, and is formed in a length of 3 millimeters and in a thickness of 2 millimeters.

Here, when each of the molding tools for the comparative embodiments is set up at 80 degrees Celsius and when the plasticized raw material of the polycarbonate resin set up at 280 degrees Celsius is injected into each of the molding tools at an injection pressure of 180 MPa, each of the first and the second comparative embodiments is casted under the same condition as the above-described embodiment.

With respect to the first comparative embodiment, a burr does not occur on the water guard rib 14 of the outer lens 10, and the outer lens 10 can be attached to the casing 20 with confidence via the sealing material, which is disposed between the inner surface 13a, the outer surface 13b and the end of the sealing projection 13 and the inner surface 21a of the sealing concave portion 21 of the casing 20 in the same manner as the original embodiment.

However, a burr may occur on the water guard rib 14 of the outer lens 10 of the second comparative embodiment, in which the thickness of the facing portion 11 and the peripheral portion 12 is less than 2.5 millimeters. Accordingly, the outer lens 10 cannot be attached to the casing 20 with confidence, if the burr that is caused by a parting surface of the molding tool is removed from the water guard rib 14 of the outer lens 10.

Especially, the burr trends to occur on the water guard rib 14 near a gate of the molding tool. That may be because the thickness of the sealing projection 13 is appreciably thicker than that of the facing portion 11, and therefore a high injection pressure is applied to a cavity casting the water guard rib 14 of which the thickness is considerably thinner than that of the sealing projection 13, in a detaching direction of the molding tool from the sealing projection 13 located near the gate of the molding tool.

In this case, the plasticized polycarbonate resin having the injection pressure of 180 MPa, which is injected into the molding tool, will have an injection pressure of 45 MPa in the cavity casting the water guard rib 14. The injection pressure applied to the cavity casting the water guard rib 14 in the second comparative embodiment is more than 20 percentage of the injection pressure of 37 MPa applied to the third cavity casting the second water guard rib 14b in the embodiment of FIG. 2.

Thus, the structure of the disclosed subject matter can be very useful to cast the outer lens 10 having a thin thickness of less than 2.5 millimeters, and also can be very simple to design and manufacture a molding tool for casting the outer lens 10 having a thin thickness in common with a conventional molding tool.

Figure 5:
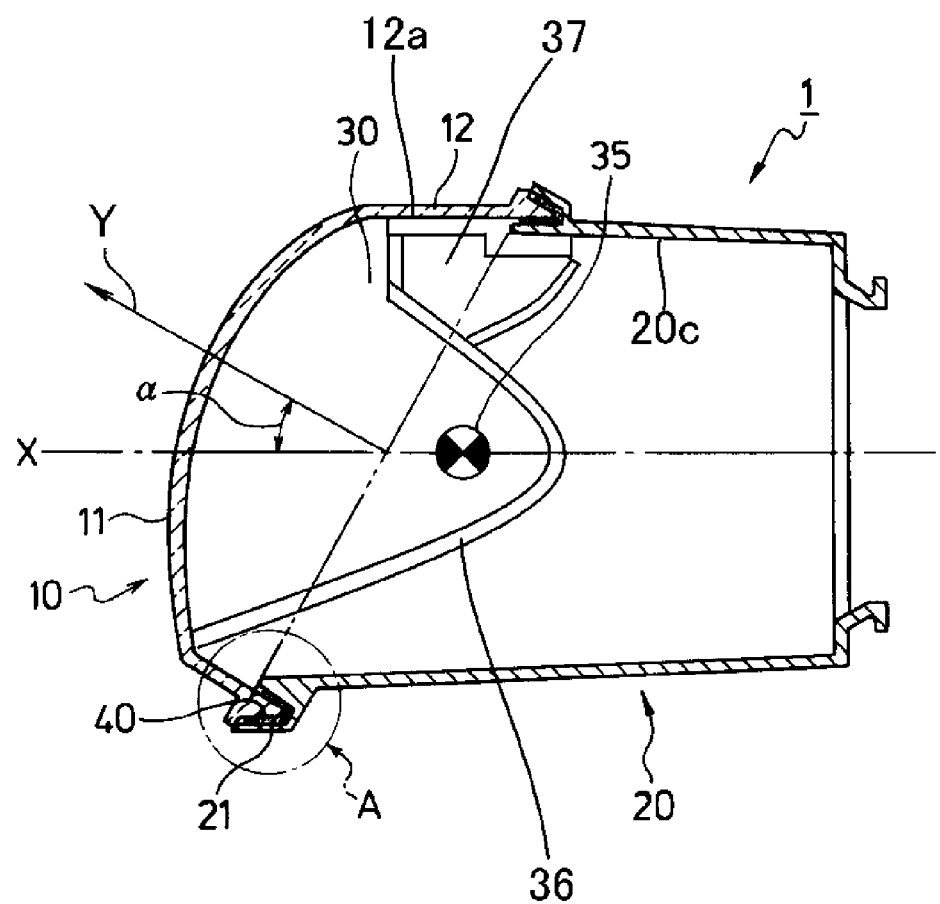
FIG. 5 is a cross-sectional view showing an exemplary embodiment of a headlight using the outer casing for headlights of FIG. 1b made in accordance with principles of the disclosed subject matter.
Figure 6:
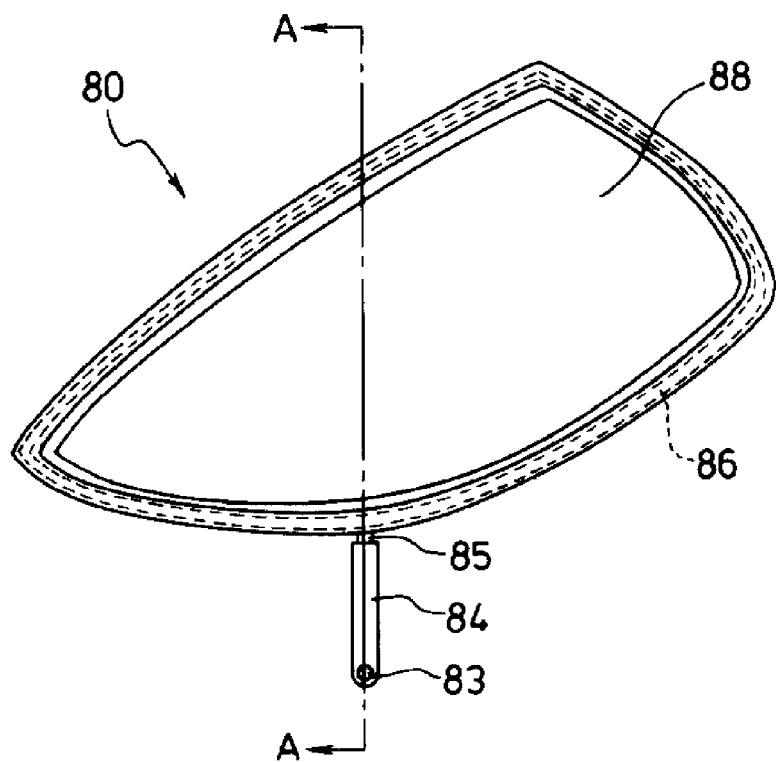
FIG. 6 is a top view showing a conventional general outer lens for a headlight.
Figure 7:
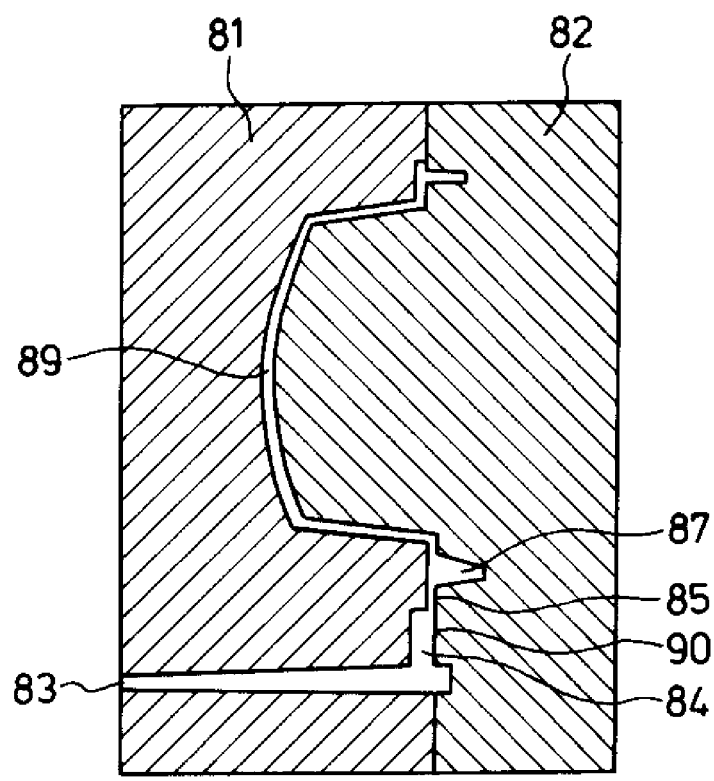
FIG. 7 is a side cross-sectional view showing the conventional outer lens taken along line A-A shown in FIG. 6, in a case where the outer lens is casted by a molding tool.
Figure 8:
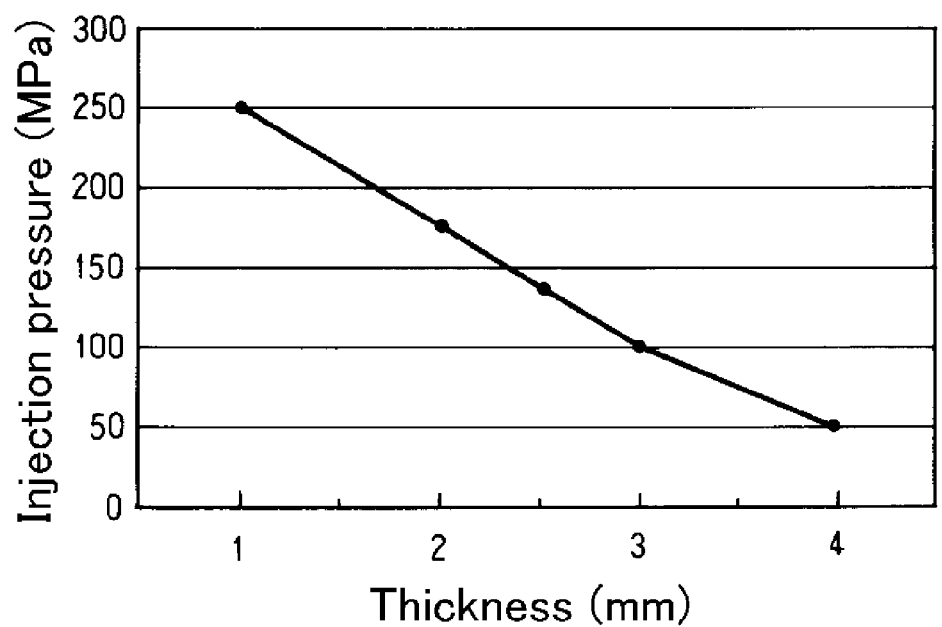
FIG. 8 is a graph showing a relationship between a thickness of a molding product and an injection pressure.
Figure 9:
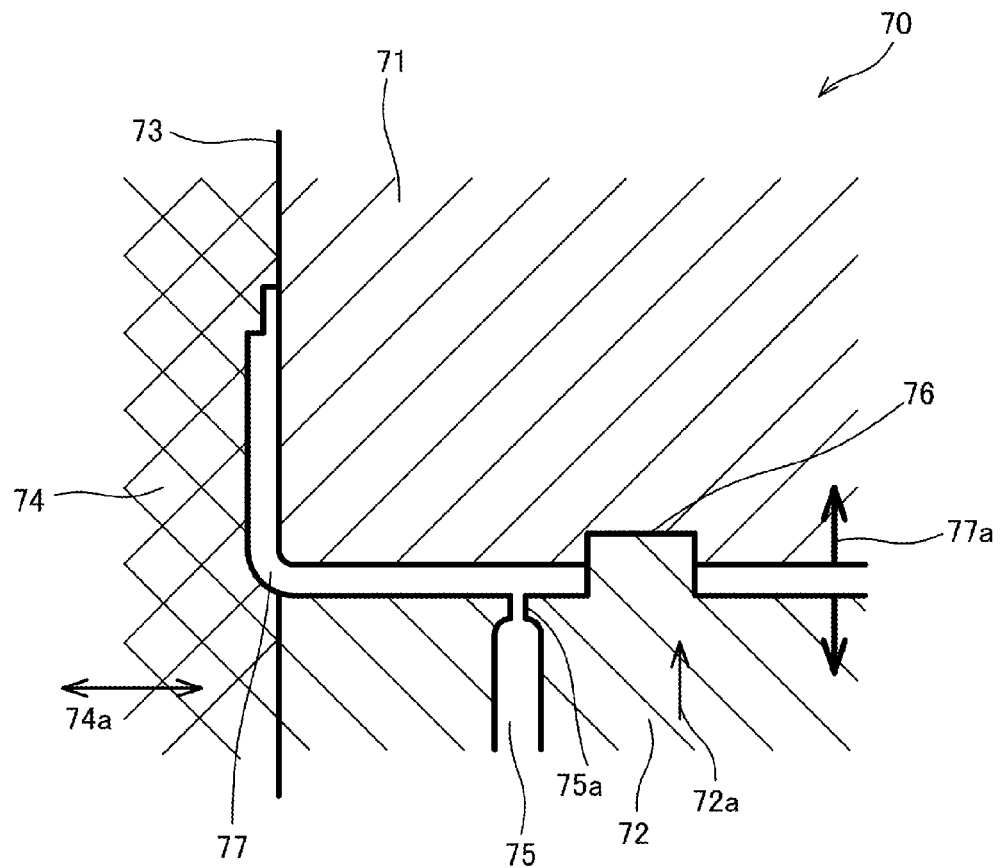
FIG. 9 is a schematic side cross-sectional view of a basic structural concept of a conventional molding tool to cast a casing having a thin thickness.

FIG. 5 is a cross-sectional view showing an exemplary embodiment of a headlight using the outer casing 1 for headlights of FIG. 1b. When a high beam headlight is incorporated into the outer casing 1, the high beam headlight can be structured in the outer casing 1 by locating a reflector 36 in the lamp room 30 so that light emitted from the light source 35 is emitted in a light-emitting direction of the high beam headlight using the reflector 36 via the outer lens 10 of the outer casing 1.

When a low beam headlight is incorporated into the outer casing 1, a shade can be located at least one of in the light source 35 and between the outer lens 10 and the light source 35 to form a light distribution pattern for a low beam while the shade prevents the light source 35 from causing a glare type light to an oncoming vehicle. The low beam headlight and the high beam headlight can also be adjacently incorporated into the lamp room 30.

In addition, a position lamp (a light source is not shown in the lamp room 37) can be located between the headlight and the inner surfaces 12a and 20c, which are located at the upper portions of the peripheral portion 12 of the outer lens and the casing 20. In this case, when the inner surfaces 12a and 20c of the outer lens and the casing 20 are parallel with each other as described above, the position lamp may be easily located in order to be able to provide a favorable light distribution pattern. Moreover, a turn signal lamp can also be incorporated in the lamp room 30 or 37 so as to be located at both front sides of a vehicle to provide a favorable light distribution patter via the outer lens 10.

As described above, the disclosed subject matter can cast the outer lens 10 of the outer casing 1 so that the plasticized resin having a high injection pressure (e.g., 180 MPa) injected into a cavity casting the facing portion 11 and the peripheral portion 12 of the outer lens 10 can reduce that having a low injection pressure (e.g., 37 MPa) in another cavity casting the water guard rib, even when the lens thickness of the outer lens 10 is formed in a thickness of less than 2.5 millimeters. Additionally, the structure can provide the ouster casing 1 including the thin outer lens 10 with a high airtight structure and an adequate mechanical strength. Thus, the disclosed subject matter can provide outer casings 1 for headlights including a thin outer lens, which can be casted by a simple molding tool that can prevent an occurrence of burr on the outer lens 10.

Moreover, the thin outer lens 10 can be attached to the casing 20 with confidence by fixing between the sealing concave portion 21 of the casing 20 and the sealing projection 13 of the outer lens 10 such that a burr is prevented via the at least one interlocking member. Thus, the disclosed subject matter can provide headlights using the outer casings 1, which can incorporate various lamps such as a low beam headlight and the like with a high airtight structure and an adequate mechanical strength, even when the lens thickness of the outer lens 10 is formed in a thickness of less than 2.5 mil meters.

Furthermore, a case where each of cross-sectional shapes of the first water guard rib 14*a* and the second water guard rib 14*b* which is continuously connected to the first water guard rib 14*a* in a rectangular fashion is described. However, each of the cross-sectional shapes is not necessarily limited to a rectangular shape. If the cross-sectional shape of the second water guard rib 14*b* is larger than that of the first guard rib 14*a* so that the injection pressure in the third cavity 65*c* casting the second water guard rib 14*b* becomes substantially lower than that in the second cavity 65*b* casting the first water guard rib 14*a*, at least one of the cross-sectional shapes can be formed in various shapes such as a dome shape, a trapezoidal shape, etc.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An outer casing for a headlight:
   an outer lens having a facing portion, a peripheral portion, an upper portion, a lens thickness, a sealing projection and a water guard rib, the outer lens casted by a transparent thermoplastic resin and formed in a dome shape having an opening, the peripheral portion having an inner surface and an outer surface formed in a ring shape so as to surround the facing portion having the lens thickness of the outer lens and being continuously connected to the facing portion, and therefore the peripheral portion having a substantially same lens thickness as the lens thickness of the facing portion, and connecting to the sealing projection on an opposite side of the facing portion, the opening of the outer lens including at least the inner surface of the peripheral portion, the sealing projection having a thickness, at least three surfaces including an inner surface an outer surface and a connecting surface, and also having an end located between the inner surface and the outer surface on the opposite side of the connecting surface, the connecting surface of the sealing projection being connected to the outer surface opposite the inner surface of the peripheral portion, the thickness of the sealing projection formed in a ring shape defined as a minimum thickness between the inner surface and the outer surface of the sealing projection, and thinning from the connecting surface toward the end of the sealing projection, the water guard rib having a thickness, an outer surface, an end surface and a guard surface being connected to the sealing projection using a resin casted between the connecting surface and the outer surface of the sealing projection, the outer surface of the water guard rib connecting to the outer surface of the sealing projection, the end surface of the water guard rib located between the outer surface and the guard surface of the water guard rib, the guard surface of the water guard rib connecting to the connecting surface of the sealing projection, the thickness of the water guard rib formed in a ring shape defined as a minimum thickness between the guard surface and the outer surface of the water guard rib, and thickening toward the end surface of the water guard rib, and wherein the lens thickness is less than a minimum inscribed circle of the at least three surfaces of the sealing projection and is more than the minimum thickness of the water guard rib;
   a casing having a first end surface, a second end surface, an upper portion, an inner surface, an opening and a sealing concave portion, and made of an opaque resin, the upper portion of the casing located adjacent the upper portion of the outer lens, the opening of the casing including the inner surface of the casing, the first end surface formed in a ring shape so as to surround the opening, the second end surface also formed in a ring shape so as to surround the first end surface, and thereby the sealing concave portion being formed between the first end surface and the second end surface and along the inner surface of the opening of the casing, and wherein at least the end located between the inner surface and the outer surface of the sealing projection is annularly inserted into the sealing concave portion, and also the second end surface of the casing annularly contacts with the outer surface of the water guard rib of the outer lens; and
   at least one interlocking member including at least one of a sealing material, an adhesive material and a hot-melt adhesive material, being disposed between the sealing concave portion of the casing and at least one of the end, the inner surface and the outer surface of the sealing projection of the outer lens.

2. The outer casing for a headlight according to claim 1, wherein the lens thickness of the outer lens is less than 2.5 millimeters.

3. The outer casing for a headlight according to claim 1, wherein the transparent thermoplastic resin of the outer lens includes a polycarbonate resin.

4. The outer casing for a headlight according to claim 2, wherein the transparent thermoplastic resin of the outer lens includes a polycarbonate resin.

5. The outer casing for a headlight according to claim 1, wherein a continual part of the inner surface of the peripheral portion located at the upper portion of the outer lens is substantially parallel to a continual part of the inner surface of the opening located at the upper portion of the casing so that an imaginary surface extending from the continual part of the inner surface of the opening located at the upper portion of the casing toward the outer lens does not intersect with the continual part of the inner surface of the peripheral portion located at the upper portion of the outer lens.

6. The outer casing for a headlight according to claim 2, wherein a continual part of the inner surface of the peripheral portion located at the upper portion of the outer lens is substantially parallel to a continual part of the inner surface of the opening located at the upper portion of the casing so that an imaginary surface extending from the continual part of the inner surface of the opening located at the upper portion of the casing toward the outer lens does not intersect with the continual part of the inner surface of the peripheral portion located at the upper portion of the outer lens.

7. The outer casing for a headlight according to claim 1, wherein the outer surface of the water guard rib of the outer lens is annularly located on a substantially same planar surface.

8. The outer casing for a headlight according to claim 2, wherein the outer surface of the water guard rib of the outer lens is annularly located on a substantially same planar surface.

9. The outer casing for a headlight according to claim 1, wherein the inner surface of the sealing projection is continuously connected to the inner surface of the peripheral portion of the outer lens using a continuous surface.

10. The outer casing for a headlight according to claim 2, wherein the inner surface of the sealing projection is continuously connected to the inner surface of the peripheral portion of the outer lens using a continuous surface.

11. The outer casing for a headlight according to claim 1, wherein the guard surface of the water guard rib of the outer lens continuously connects to the connecting surface of the sealing projection using a continuous surface, the outer surface of the water guard rib of the outer lens is annularly formed in a continuous surface, and also the guard surface of the water guard rib annularly projects between the end surface of the water guard rib and a halfway portion of the guard surface in an opposite direction of the outer surface of the water guard rib so that the thickness of the water guard rib becomes thicker toward the end surface of the water guard rib.

12. The outer casing for a headlight according to claim 2, wherein the guard surface of the water guard rib of the outer lens continuously connects to the connecting surface of the sealing projection using a continuous surface, the outer surface of the water guard rib of the outer lens is annularly formed in a continuous surface, and also the guard surface of the water guard rib annularly projects between the end surface of the water guard rib and a halfway portion of the guard surface in an opposite direction of the outer surface of the water guard rib so that the thickness of the water guard rib becomes thicker toward the end surface of the water guard rib.

13. The outer casing for a headlight according to claim 1, wherein when a light source having an optical axis for a headlight is located in the outer casing, the optical axis of the light source intersects with an imaginary surface including the outer surface of the water guard rib at a sharp angle toward the casing.

14. The outer casing for a headlight according to claim 2, wherein when a light source having an optical axis for a headlight is located in the outer casing, the optical axis of the light source intersects with an imaginary surface including the outer surface of the water guard rib at a sharp angle toward the casing.

15. A headlight using the outer casing for a headlight according to claim 1, comprising:
at least one vehicle lamp of a low beam headlight and a high beam headlight incorporated into the outer casing so that light emitted from each of the low beam headlight and the high beam headlight is emitted in each light-emitting direction of the low beam headlight and the high beam headlight via the outer lens of the outer casing.

16. A headlight using the outer casing for a headlight according to claim 2, comprising:
at least one vehicle lamp of a low beam headlight and a high beam headlight incorporated into the outer casing so that light emitted from each of the low beam headlight and the high beam headlight is emitted in each light-emitting direction of the low beam headlight and the high beam headlight via the outer lens of the outer casing.

17. The headlight according to claim 15, further comprising:
at least one of a turn signal lamp and a position lamp incorporated into the outer casing so that light emitted from the at least one of the turn signal lamp and the position lamp is emitted in each light-emitting direction of the at least one of the turn signal lamp and the position lamp via the outer lens of the outer casing.

18. The headlight according to claim 16, further comprising:
at least one of a turn signal lamp and a position lamp incorporated into the outer casing so that light emitted from the at least one of the turn signal lamp and the position lamp is emitted in each light-emitting direction of the at least one of the turn signal lamp and the position lamp via the outer lens of the outer casing.

19. The headlight according to claim 15, wherein a continual part of the inner surface of the peripheral portion located at the upper portion of the outer lens is substantially parallel to a continual part of the inner surface of the opening located at the upper portion of the casing so that an imaginary surface extending from the continual part of the inner surface of the opening located at the upper portion of the casing toward the outer lens does not intersect with the continual part of the inner surface of the peripheral portion located at the upper portion of the outer lens.

20. The headlight according to claim 16, wherein a continual part of the inner surface of the peripheral portion located at the upper portion of the outer lens is substantially parallel to a continual part of the inner surface of the opening located at the upper portion of the casing so that an imaginary surface extending from the continual part of the inner surface of the opening located at the upper portion of the casing toward the outer lens does not intersect with the continual part of the inner surface of the peripheral portion located at the upper portion of the outer lens.

* * * * *